Aug. 25, 1953　　　C. A. BALLARD　　　2,650,074
SPRING OR GRAVITY BIASED RADIAL SEAL
Filed Oct. 12, 1950　　　2 Sheets-Sheet 1

INVENTOR.
Clayton A. Ballard
BY
ATTORNEY

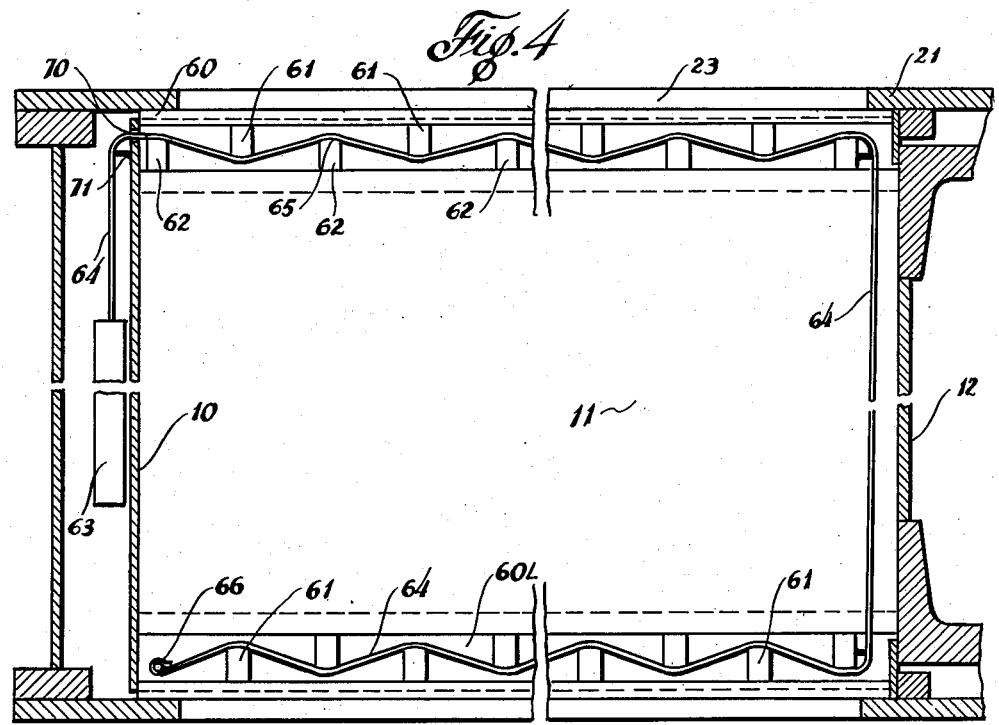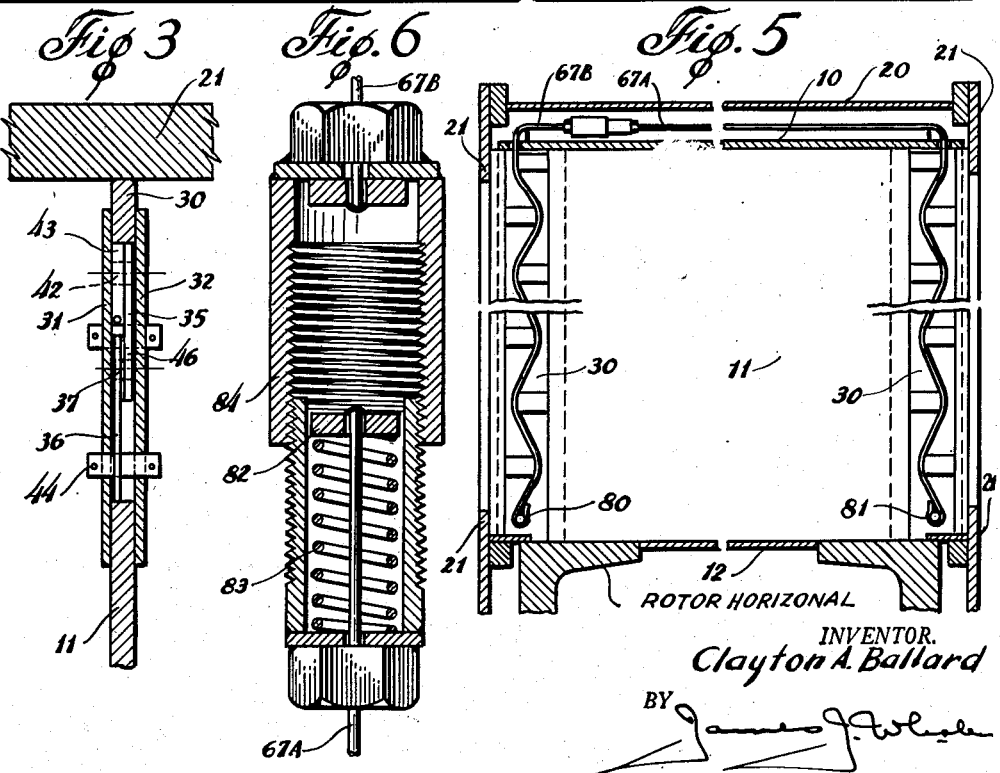

Patented Aug. 25, 1953

2,650,074

UNITED STATES PATENT OFFICE 2,650,074

SPRING OR GRAVITY BIASED RADIAL SEAL

Clayton A. Ballard, Belmont, N. Y., assignor to The Air Preheater Corporation, New York, N. Y.

Application October 12, 1950, Serial No. 189,753

6 Claims. (Cl. 257—6)

The present invention relates to improved radial seals for use between the rotor and the end plates of its enclosing housing in a rotary regenerative air preheater or similar apparatus.

In a rotary regenerative heater of the Ljungstrom type a cylindrical rotor has compartments carrying heat transfer material which as the rotor turns is first exposed to heating gases and then disposed in the air passage to impart the absorbed heat to the air. The rotor is surrounded by a housing having end plates formed with openings to provide for the flow of gas and air. To prevent the mingling of the two fluids the partitions forming the rotor compartments are provided with radial seals that bear against the imperforate portions of the sector plates between these openings, or vice versa.

The present invention contemplates mounting the radial seals for free movement on and relatively to the radial partitions and utilizing gravity or an equivalent force to maintain the seals in wiping contact with the end plates.

The invention will be best understood upon consideration of the following detailed description of several illustrative embodiments thereof when read in conjunction with the accompanying drawings in which:

Figure 3 is a view on an enlarged scale as viewed on line 3—3 in Figure 2 and illustrates the manner in which a radial seal is freely mounted on the edge of a partition and particularly shows a toggle lever system associated with the seal for maintaining it in wiping contact with the end plate.

Figure 4 is a view similar to Fig. 2 illustrating another arrangement for maintaining the seals against the end plates.

Figure 5 shows the apparatus of Fig. 4 applied to a rotor turning on a horizontally disposed axis rather than a vertical one.

Figure 6 is an enlarged view of part of the apparatus of Fig. 5.

Figure 1:
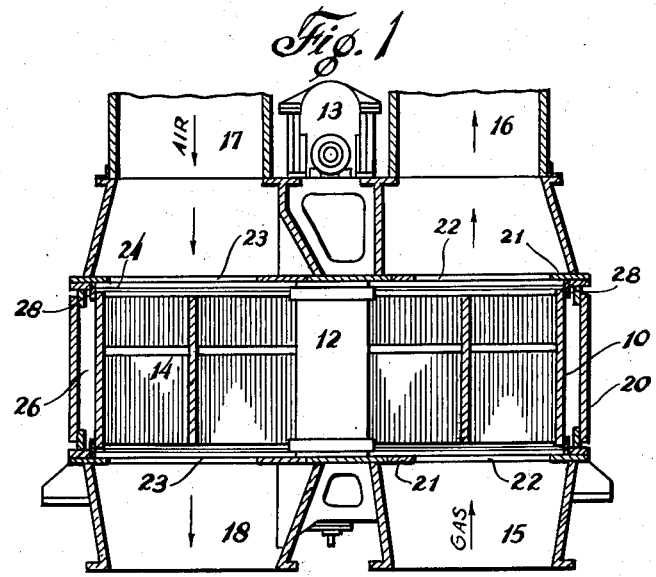
Figure 1 is a sectional elevational view in diagrammatic form of a rotary regenerative air preheater embodying the present invention.

In the drawings the numeral 10 designates the cylindrical shell of a rotor divided into sector shaped compartments by radial partitions 11 connecting it with the rotor post 12 which is driven by a motor and reduction gearing 13 to turn the rotor slowly about its axis. The rotor compartments contain regenerative heat transfer material in the form of closely spaced metallic plates 14 which first absorb heat from hot gases entering the preheater through a duct 15 from a boiler or other source to be discharged after passing over the heat transfer plates 14 through an outlet duct 16 to which an induced draft fan (not shown) is connected. As the rotor turns slowly about its axis, the heated plates 14 are moved into the stream of air admitted through the duct 17 to which a forced draft fan (not shown) is connected. After passing over the plates 14 and absorbing heat therefrom the stream of air is conveyed to the boiler furnace or other place of use through duct 18.

Figure 2:
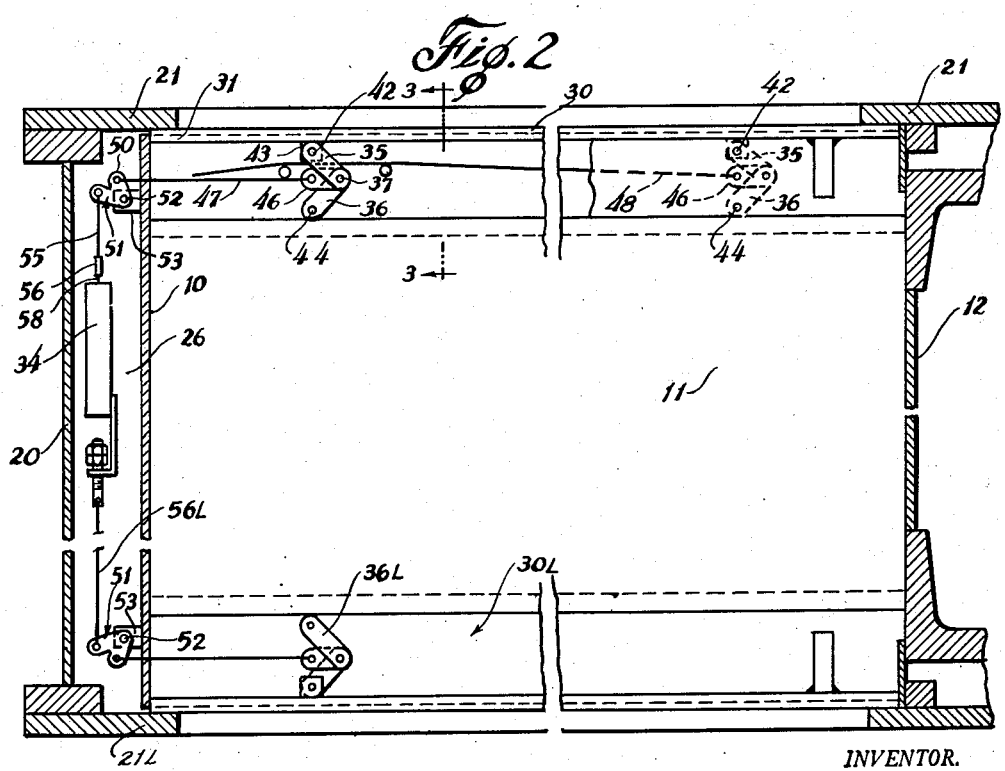
Figure 2 is a broken away elevational view on an enlarged scale illustrating radial seals on the upper and lower edges of one of the partitions that form the rotor compartments, the seals being shown in cooperative relation with the imperforate portions of the end plates.

A housing 20 enclosing the rotor 10 is provided at either end opposite the latter with end or sector plates 21 which are apertured at 22 and 23 to admit and discharge streams of gas and air flowing through the preheater. In order that the streams of gas and air may not commingle, a portion of the rotor at least equal to but usually greater in circumferential extent than one rotor compartment must be isolated or blocked off between the gas and air passages. As illustrated, radial seals designated as a whole by the numeral 24 in Fig. 1 are provided in cooperative relation between the radial partitions 11 and the sector plates 21 whose imperforate portions Fig. 2 must be at least slightly greater than the width of the compartments in the rotor. In order that the streams of gas and air may not by-pass the heat transfer surface 14 by flowing in the annular clearance space 26 between the rotor shell 10 and the housing 20 it is customary to provide circumferential seals indicated diagrammatically at 28 on the shell 10 which wipe against the sector plates 21 or allied parts so as to seal off the space 26 at both ends of the rotor.

In accordance with the present invention the radial seals are in the form of sealing shoes 30 and 30L each freely mounted in a slot between a pair of retainer plates 31 and 32 (Fig. 3) that project from the radial edge of the partition 11. These seals are maintained in contact with the imperforate portions 25 lying between the gas and air openings in the end plates 21. In the form shown in Figures 2 and 3 counterweights 34 are provided in the space between the rotor shell 10 and housing 20. One of these is connected to the pair of upper and lower radial sealing shoes 30 and 30b on each partition 11 through a cable system acting eventually on toggle levers attached to the sealing shoes and their retainers. Toggle levers 35 and 36 connected together at 37 at their inner ends have their outer ends connected respectively to a pivot pin 42 on a bracket 43 fixed to sealing shoe 30 and a pivot pin 44 mounted between the related retainer plates 31, 32. Two toggle levers are provided for each sealing shoe, the third levers or connecting links 46 pivoted to levers 35, 36 at 37 being connected through cables 47, 48 to the vertical arms 50 of two bell cranks 51 pivoted at 52 on a bracket 53 fixed to the outside of the rotor shell 10 which is apertured for passage of these cables. The other arm 50 of each bell crank is connected by a cable 55 to one end of an equalizer bar 56 whose center point is in turn connected by a single cable 58 with the counterweight 34.

The lower sealing shoe 30L on each partition is likewise connected to the counterweight 34 through toggle 36L and cable 56L. In the event that the upper end plate 21 or the rotor 10 move with respect to each other in an axial direction the counterbalance 34 acting through the toggles 36 maintains the upper sealing shoes 30 in contact with the upper end plate and accommodates the distortion so as to maintain a good seal. In the event that the rotor moves closer to the upper end plate the toggles 36 squeeze together by pressure of the end plate against the upper seal thus lifting the counterbalance 34 which would act on the lower toggle lever 36L to force the lower seal 30L against the lower end plate 21L. The lower sealing shoe 30L would normally contact the lower contact plate 21L because of gravity, but the related toggle lever functions in case the seal does not follow the end plate. The weight of the lower seal 30L also may be considered as acting through the cables 56, 56L and counterweight 34 to press the upper seal 30 out into contact with the upper end plate.

In the form shown in Figure 4 the sealing shoes 60 and 60L are provided on their sides with lugs 61 and 62 extending inwardly from their upper and lower edges in alternation. The sealing shoes are held in contact with the end plates by a counterweight 63 attached to one end of a cable 64 threaded sinuously along the radial seals between the lugs 61, 62 in such manner as to contact the ends 65 of all the lugs. In the case of the upper seal the lower lugs 62 serve as fulcrums for the cable 64 to apply a lifting force to the lugs 61 to force the seal outwardly against the end plate. The other end of the cable 64 is attached at 66 to the lower sealing shoe 60L and running inwardly sinuously along this seal in engagement with the lugs 61, 62 extends upwardly in the space between a so-called filler plate 67 within each compartment and the adjacent rotor post 12 and then extends outward to engage with the lugs 61, 62 of the upper sealing shoe 30 to pass through an opening 70 in the rotor shell 10 and downwardly through a guide bracket 71 to the counterbalance 63.

When the preheater is mounted so that the rotor turns on a horizontal axis as indicated in Figure 5, the two ends of the cable are attached at 80, 81 to the radial sealing shoes 30 now located at the opposite sides of the rotor on the partition 11. The cable is in two sections 67A and 67B one of which is attached to a plunger 82 acting against a tension spring 83 in a housing 84 to which latter the other section of the cable 67B is attached. The spring 83 by applying tension to the sealing shoes on the partitions 11 maintains both sealing shoes in contact with the end plates 21.

What I claim is:

1. In a regenerative air preheater having a rotor made up of a cylindrical shell joined to a rotor post by radial partitions forming compartments that carry heat transfer material, and a housing surrounding the rotor and provided opposite the latter with end plates formed with circumferentially spaced apertures for the flow of heating gases and air to and through the rotor; a pair of sealing strips mounted respectively on the upper and lower radial edges of said partitions for free movement axially of the rotor and projecting outwardly from the latter into the spaces between the rotor and said end plates with their radially extending edges engageable with said end plates; means freely connecting the two radial sealing strips on each partition to each other; and means acting on and through said connecting means to apply a force to said two sealing strips to move them in opposite directions axially of the rotor with respect to said partition for maintaining them in contact with the adjacent end plate.

2. In a regenerative air preheater having a rotor made up of a cylindrical shell joined to a rotor post by radial partitions forming compartments that carry heat transfer material, and a housing surrounding the rotor and provided opposite the latter with end plates formed with circumferentially spaced apertures for the flow of heating gases and air to and through the rotor; sealing strips freely mounted on both the upper and the lower radial edges of said partitions and projecting axially of the rotor into the spaces between the rotor and said end plates with their radially extending edges engageable with said end plates; retainer means fixed to said partitions for guiding said sealing strips in movement axially of the rotor with respect to said partitions; a pair of interconnected toggle levers pivotally connected respectively with each sealing strip and the fixed retainer means therefor; force transmitting cables connected with said toggle means; and means for applying force to said cable means for causing actuation of said toggle levers to maintain said sealing strips in contact with said end plates.

3. In a regenerative air preheater having a rotor made up of a cylindrical shell joined to a rotor post by radial partitions forming compartments that carry heat transfer material, and a housing surrounding the rotor and provided opposite the latter with end plates formed with circumferentially spaced apertures for the flow of heating gases and air to and through the rotor; sealing strips freely mounted on both the upper and the lower radial edges of said partitions and projecting axially of the rotor into the spaces between the rotor and said end plates with their radially extending edges engageable with said end plates; retainer means fixed to said partitions for guiding said sealing strips in movement axially of the rotor with respect to said partitions; and weight means so connected to said sealing strips as to act thereon to maintain said sealing strips in contact with said end plates.

4. In a regenerative air preheater having a rotor made up of a cylindrical shell joined to a rotor post by radial partitions forming compartments that carry heat transfer material, and a housing surrounding the rotor and provided opposite the latter with end plates formed with circumferentially spaced apertures for the flow of heating gases and air to and through the rotor; sealing strips freely mounted on both the upper and the lower radial edges of said partitions and projecting axially of the rotor into the spaces between the rotor and said end plates with their radially extending edges engageable with said end plates; retainer means fixed to said partitions for guiding said sealing strips in movement axially of the rotor with respect to said partitions; cable means attached to at least one of the pair of sealing strips on each partition and so arranged with respect to both upper and lower sealing strips that application of a tensioning force to said cable effects movement of said sealing strips axially of the rotor with respect to said partitions to maintain both upper and lower sealing strips in contact with the related end plates; and means for applying said tensioning force to said cable means.

5. Radial sealing means as recited in claim 4 wherein said tension applying means comprises a suspended counterweight connected to said cable means.

6. Radial sealing means as recited in claim 4 wherein said tension applying means comprises a tension spring connected between sections of said cable means.

CLAYTON A. BALLARD.

References Cited in the file of this patent

UNITED STATES PATENTS

| Number | Name | Date |
|---|---|---|
| 1,025,792 | Doolan | May 7, 1912 |
| 1,104,588 | Wagner | July 21, 1914 |
| 2,229,691 | Boestad | Jan. 28, 1941 |
| 2,287,777 | Boestad | June 30, 1942 |

FOREIGN PATENTS

| Number | Country | Date |
|---|---|---|
| 500,682 | Great Britain | Feb. 14, 1939 |
| 517,600 | Great Britain | Feb. 2, 1940 |